United States Patent
Nikander et al.

(10) Patent No.: US 6,253,321 B1
(45) Date of Patent: Jun. 26, 2001

(54) METHOD AND ARRANGEMENT FOR IMPLEMENTING IPSEC POLICY MANAGEMENT USING FILTER CODE

(75) Inventors: Pekka Nikander, Helsinki; Tatu Ylonen, Espoo, both of (FI)

(73) Assignee: SSH Communications Security Ltd.

( * ) Notice: Subject to any disclaimer, the term of this patent is extended or adjusted under 35 U.S.C. 154(b) by 0 days.

(21) Appl. No.: 09/100,272

(22) Filed: Jun. 19, 1998

(51) Int. Cl.[7] ................................................. G06F 1/24
(52) U.S. Cl. ..................... 713/160; 713/162; 713/168; 713/200
(58) Field of Search ................................. 713/160, 162, 713/168, 189, 200, 201

(56) References Cited

U.S. PATENT DOCUMENTS

| | | | |
|---|---|---|---|
| 4,715,030 | * 12/1987 | Koch et al. | 370/401 |
| 5,172,111 | * 12/1992 | Olivo, Jr. | 386/126 |
| 5,448,698 | * 9/1995 | Wilkes | 709/245 |
| 5,561,770 | * 10/1996 | Bruijn et al. | 709/225 |
| 5,615,340 | * 3/1997 | Dai et al. | 709/250 |
| 5,761,424 | 6/1998 | Adams et al. | 395/200 |
| 6,092,110 | * 7/2000 | Maria et al. | 709/225 |

FOREIGN PATENT DOCUMENTS

| | | |
|---|---|---|
| WO 97/00471 | 1/1997 | (WO) . |
| WO 98/26555 | 6/1998 | (WO) . |

* cited by examiner

*Primary Examiner*—Thomas R. Peeso
(74) *Attorney, Agent, or Firm*—Ronald C. Fish; Falk & Fish

(57) ABSTRACT

A data processing system implements a security protocol based on processing data in packets. The data processing system comprises processing packets for storing filter code and processing data packets according to stored filter code, and a policy managing function for generating filter code and communicating generated filter code for packet processing. The packet processing function is arranged to examine, whether the stored filter code is applicable for processing a certain packet. If the stored filter code is not applicable for the processing of a packet, the packet is communicated to the policy managing function, which generates filter code applicable for the processing of the packet and communicates the generated filter code for packet processing.

28 Claims, 4 Drawing Sheets

METHOD AND ARRANGEMENT FOR IMPLEMENTING IPSEC POLICY MANAGEMENT USING FILTER CODE

FIELD OF USE

The invention relates to the field of implementing protocols that authenticate and encrypt/decrypt packetised digital information.

BACKGROUND TO THE INVENTION

The IP security protocol (IPSEC) is being standardized by the IETF (Internet Engineering Task Force) for adding security to the well known and widely used IP protocol. It provides cryptographic authentication and confidentiality of traffic between two communicating network nodes. It can be used in both end-to-end mode, i.e. directly between the communicating nodes or hosts, or in tunnel mode between firewalls or VPN (Virtual Private Network) devices.

Asymmetric connections, where one end is a host and the other end is a firewall or VPN are also possible.

IPSEC defines a set of operations for performing authentication and encryption on packet level by adding new protocol headers to each packet. IPSEC authentication of a data packet is performed by computing an authentication code over all data and most of the header of the data packet. The authentication code further depends on a secret key, known only to the communicating parties. The authentication code is then stored in the packet, appropriately wrapped in a well-defined header or trailer.

The operations to be performed on each packet are controlled by a policy that specifies which authentication and encryption methods, jointly called transforms, are to be applied between each pair of communicating hosts. The parameters specifying the cryptographic algorithms, cryptographic keys, and other data related to securely processing packets between two hosts or peers is called a security association.

A certain policy is typically expressed as a set of policy rules, each rule specifying a set of selectors (such as source IP address, destination IP address, subnet, protocol, source port number, destination port number) constraining the communication or set of communications to which the rule applies. Several rules may apply to a particular packet, and there is normally a mutual order of the rules so that a single rule can be unambiguously chosen for each incoming and outgoing packet.

The IPSEC standard and published implementations present a data structure called the policy database, which is an array or table in memory and contains rules. The rules in the policy database are consulted for each packet to be processed. FIG. 1 is a simplified graphical illustration of a known IPSEC implementation 100, which contains a policy database 101 and separates a secure internal network 102 from the Internet network 103. For the sake of simplicity, packets flowing only to one direction (outgoing packets) are considered. The input packets 104 in FIG. 1 contain data that a user in the internal network 102 wants to send to another user through the Internet and that need to be processed for authentication and encryption. In the IPSEC implementation an input packet under consideration 105 is transformed into an output packet under consideration 106 by consulting the rules in the policy database 101. The transformed output packets 107 are then sent into the Internet, where they will be properly routed to the correct receiving user.

On the other hand, mechanisms for filtering IP packets have been available and well-known in the literature for a long time. Suitable mechanisms are presented for example in J. Mogul, R. Rashid, M. Accetta: *The Packet Filter: An Efficient Mechanism for User-Level Network Code* In Proc. 11th Symposium on Operating Systems Principles, pp 39–51, 1987 and Jeffrey Mogul: *Using screens to implement IP/TCP security policies*, Digital Network Systems Laboratory, NSL Network, Note NN-16, July 1991. Packet filters also have a set of rules, typically combined by a set of implicit or explicit logical operators.

The task of a packet filter is to either accept or reject a packet for further processing.

The logical rules used in packet filters take the form of simple comparisons on individual fields of data packets. Effectively, effecting a such comparison takes the form of evaluating a boolean (logical, truth value) expression. Methods for evaluating such expressions have been well-known in the mathematical literature for centuries. The set of machine-readable instructions implementing the evaluations is traditionally called the filter code. FIG. 2 illustrates a packet filter 200 with a stored filter code 201. Input packets 202 are examined one packet at a time in the packet filter 200 and only those packets are passed on as output packets 203 that produce correct boolean values when the logical rules of the filter code are applied.

The individual predicates (comparisons) of packet filter expressions typically involve operands that access individual fields of the data packet, either in the original data packet format or from an expanded format where access to individual fields of the packet is easier. Methods for accessing data structure fields in fixed-layout and variable-layout data structures and for packing and unpacking data into structures have been well-known in standard programming languages like fortran, cobol and pascal, and have been commonly used as programming techniques since 1960's.

The idea of using boolean expressions to control execution, and their use as tests are both parts of the very basis of all modern programming languages, and the technique has been a standard method in programming since 1950's or earlier.

Expressing queries and search specifications as a set of rules or constraints has been a standard method in databases, pattern matching, data processing, and artificial intelligence. There are several journals, books and conference series that deal with efficient evaluation of sets of rules against data samples. These standard techniques can be applied to numerous kinds of data packets, including packets in data communication networks.

A further well-known technique is the compilation of programming language expressions, such as boolean expressions and conditionals, into an intermediate language for faster processing (see, for example, A. Aho, R. Sethi, J. Ullman: *Compilers-Principles, Techniques, and Tools*, Addison-Wesley, 1986). Such intermediate code may be e.g. in the form of trees, tuples, or interpreted byte code instructions. Such code may be structured in a number of ways, such as register-based, memory-based, or stack-based. Such code may or may not be allowed to perform memory allocation, and memory management may be explicit, requiring separate allocations and frees, or implicit, where the run time system automatically manages memory through the use of garbage collection. The operation of such code may be stateless between applications (though carrying some state, such as the program counter, between individual intermediate language instructions is always necessary) like the operation of the well-known unix program "grep", and other similar programs dating back to 1960s or earlier. The code may also carry a state between invocations, like the well-known unix program "passwd", most database programs and other similar applications dating back to 1960s or earlier. It may even be self modifying like many Apple II games in the early 1980s and many older assembly language programs. It is further possible to compile such intermediate representation into directly executable machine code for further optimizations. All this is well-known in the art and has been taught on university programming language and compiler courses for decades. Newer well-known research has also presented methods for incremental compilation of programs, and compiling portions of programs when they are first needed.

Real-time filtering of large volumes of data packets has required optimization in the methods used to manipulate data. Thus, the standard programming language compilation techniques have been applied on the logical expression interpretation of the rule sets, resulting in intermediate code that can be evaluated faster than the original rule sets. A particular implementation of these well-known methods used in the BSD 4.3 operating system has been mentioned in popular university operating system textbooks and has been available in sample source code that has been accessible to students in many universities since at least year 1991.

Recently, a patent application was filed for the well-known methods of stateless and stateful filtering; a US patent was consequently granted with the U.S. Pat. No. 5,606,668. "Stateless filtering" is essentially the well-known BSD 4.3 packet filter (University of California, Berkeley, 1991, published for royalty-free worldwide distribution e.g. in the 4.3BSD net2 release), and "stateful filtering" adds to that what Aho, Sethi, and Ullman (1987, above) characterize on page 401 with "This property allows the values of local names to be retained across activations of a procedure. That is, when control returns to a procedure, the values of the locals are the same as they were when control left the last time." The particular book was probably the most popular textbook in university undergraduate compiler courses in late 1980s and early 1990s. The idea itself dates decades back.

A known IPSEC implementation must consult the policy database for every packet transmitted through the IPSEC implementation. High-speed VPN (Virtual Private Network) implementations, for instance, may need to process tens of thousands of packets per second. The processing overhead consisting of looking up for policy rules from a database for such packets will soon become a bottleneck of performance.

SUMMARY OF THE INVENTION

The incoming packets to a network device implementing the IPSEC method may be classified into regular and non-regular packets. The difference between the two is elaborated in more detail below. The invention resides in properly partitioning and arranging the tasks of
generating and maintaining policy databases,
based on the information in the policy databases, compiling filter code to be applied on packets,
using the compiled filter code for separating non-regular packets from regular packets, and potentially processing regular packets, and
creating new pieces of compiled filter code as a potential response to each occurrence of a non-regular packet.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED AND ALTERNATIVE EMBODIMENTS

Figure 1:
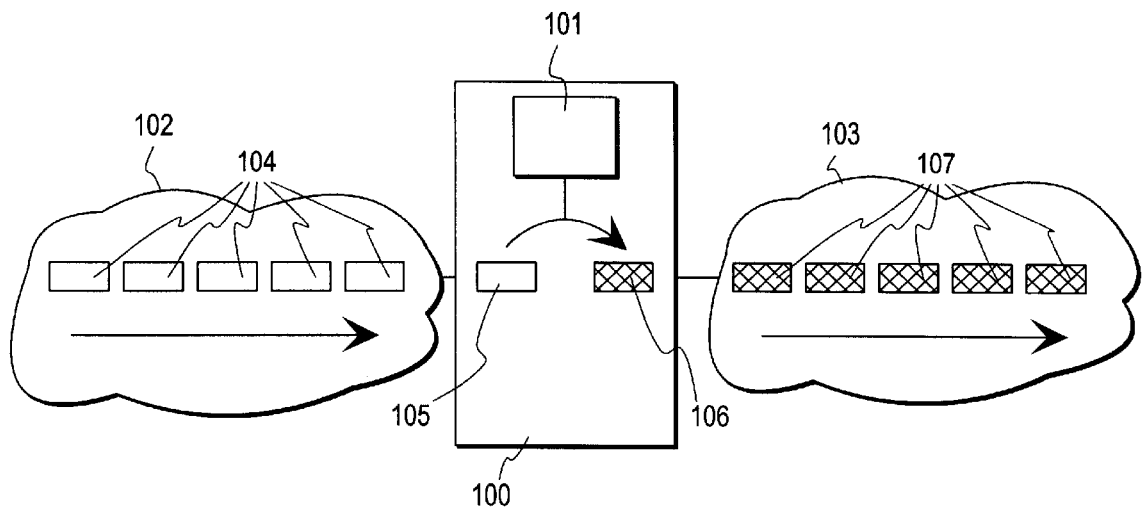
FIG. 1 illustrates a known IPSEC implementation.
Figure 2:
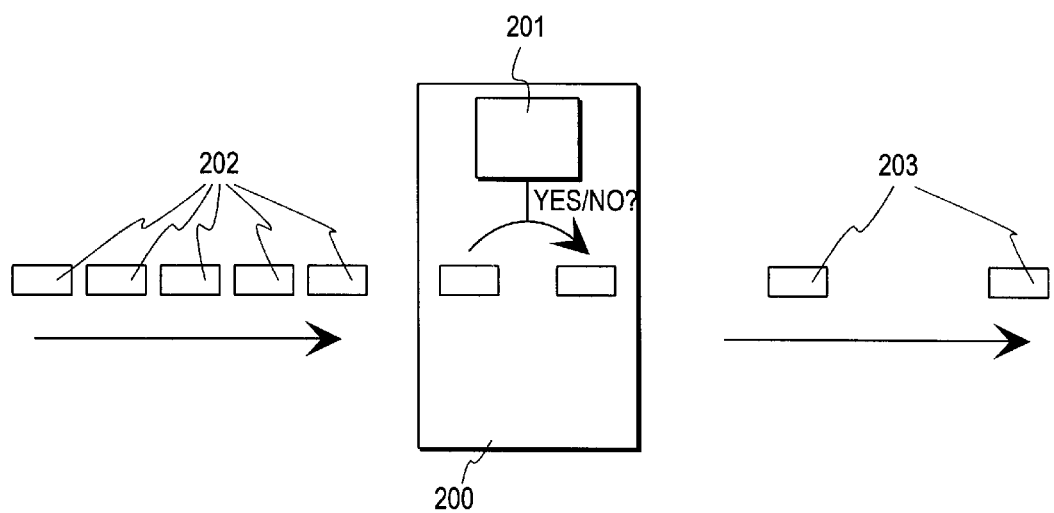
FIG. 2 illustrates a known packet filter.

A device or process responsible for implementing the packet transformations according to the IPSEC method in a network device is generally called an "IPSEC packet processing engine" or an "IPSEC engine" for short. According to the invention, the operations to be performed on incoming and/or outgoing packets may in general be represented by means of a certain filter code, although the requirements for a filter code in an IPSEC policy application are much more complicated than in the simple packet filtering case referred to above in the description of prior art. A known packet filter simply sorts incoming packets into acceptable and non-acceptable packets. An IPSEC engine must deal with the security policy, the currently active security associations and the transforms between incoming and outgoing packets. Additionally, the IPSEC engine must deal with security association creation and expiration and consult external key managers. In the invention, compiled filter code forms the core of the control logic of an IPSEC engine. The filter code controls the processing of incoming and outgoing packets, controls the application of transforms applied to data packets, and makes policy decisions about packets to be dropped or passed without applying transforms. The filter code communicates with a separate policy manager that makes the actual policy decisions and generates new compiled filter code according to need. The need for new compiled filter code potentially arises each time when the IPSEC engine receives a packet that it can not handle according to the existing compiled filter code. The policy manager then implements the policy for the packet causing the "trouble" and for similar future packets.

The compiled filter code effectively acts as a cache of recently made policy decisions, and any new decisions are referred to the more general policy manager code. This makes the difference between regular and non-regular packets evident: regular packets bear enough resemblance to some previously handled packet so that the IPSEC engine may apply the compiled filter code. A non-regular packet is the first of its kind to arrive into the IPSEC engine so that the compiled filter code does not contain enough information for its handling, whereby the policy manager must be consulted and new policy decision(s) must be made, which then become(s) part of the compiled filter code. The invention makes the processing of bulk data very efficient, yet it allows the full flexibility of a sophisticated, user mode policy manager with arbitrary key management protocols and other features that are impossible to implement using known packet filter solutions. The filter code also has an important role in making the system secure and robust; the filter code is in most cases able to drop and ignore invalid or unacceptable packets very fast, without needing to consult the policy manager. This helps against resource exhaustion attacks. The filter code also tightly controls the application of transformations, preventing resource attacks by nested encryptions.

An additional feature to improve robustness is that the filter code is designed in such way that it will always terminate, even in the case that an incorrect filter code is somehow generated. These features make the filter code particularly suitable for execution in an operating system kernel environment for maximal performance. The detailed procedure for ensuring termination is discussed more thoroughly below.

Figure 3:
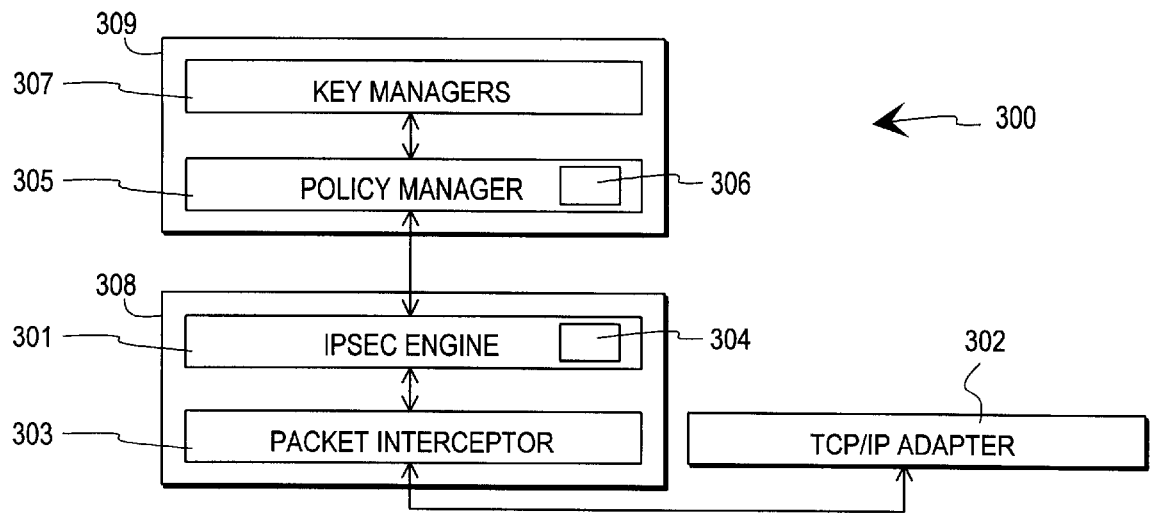
FIG. 3 illustrates an advantageous embodiment of the invention.

The components of an IPSEC implementation 300 according to a first embodiment of the invention are roughly outlined in FIG. 3. The IPSEC engine 301 interfaces with a TCP/IP stack and/or network adapters generally represented by block 302 using a packet interceptor 303 (known as such) which passes IP packets through to the IPSEC engine for IPSEC processing. The IPSEC engine 301 performs packet-per packet processing, such as choosing and applying cryptographic transformations on packets as generally described in known IPSEC literature. It also contains the filter code mechanism 304 described in this invention. A separate policy manager 305 maintains the full policy database 306 about acceptable communications and required authentications, and makes policy decisions about how each packet is to be handled. The key managers block 307 is a further functional entity that communicates with the policy manager 305 and performs on its behalf the actual key exchanges needed for the IPSEC authentication and/or encryption/decryption processes. The key managers block 307 may use in its operation any protocols known as such, e.g. the ISAKMP/Oakley protocol, where ISAKMP means Internet Security Association Key Management Protocol.

Different sections of the block diagram in FIG. 3 have different performance requirements. The packet interceptor 303 potentially sees every packet in the network, including both IP packets and packets according to other protocols. It must be able to separate IP packets from the other packets and pass them on to the IPSEC engine 301 at the full supported packet rate. The IPSEC engine 301 normally sees every IP packet, and it must be able to process these packets also at the full supported packet rate. Both the packet interceptor 303 and the IPSEC engine 301 typically reside in an operating system kernel 308 of the computerized network device where the IPSEC implementation 300 takes place to minimize communication costs.

The policy manager 305 and the key manager 307 perform tasks that may take longer to complete than operations in the full-rate processing blocks 303 and 301. A typical examination of the policy database 306 by the policy manager 305 may involve looking at hundreds of individual rules, and may even involve communication with external hosts (not shown) to determine the appropriate policy in each case. Key exchanges effected by the key managers block 307 often take even longer than the policy database examinations, up to several seconds in some cases. The policy manager 305 and key managers block 307 also do not have very clearly defined resource requirements. It is thus most preferable to implement them as user-mode processes in the user-mode process space 309 of the network device.

Communication between kernel-mode and user-mode processes in a general purpose computer is fairly time-consuming, involving substantial overhead and data copying every time a message is passed. Thus it is desirable to reduce the amount of such communications. In an embodiment of the invention according to FIG. 3 this means reducing the amount of communication between the IPSEC engine 301 and the policy manager 305. The filter code mechanism 304 serves this purpose, because once a policy decision has been saved into the filter code mechanism in the form of compiled filter code, regular packets that can be handled according to that filter code cause no further transferring of messages between the IPSEC engine 301 and the policy manager 305.

It is possible and sometimes desirable to implement even the IPSEC engine in user mode instead of the operating system kernel. However, due to the different response time requirements of the IPSEC engine and the policy manager, it is even then desirable to run them in separate threads or processes, which introduces more or less the same communication overheads as implementing the IPSEC engine in the operating system kernel.

For the system according to the invention to work properly it is important to have a well-defined work distribution between the IPSEC engine and the policy manager. All packet processing that needs to be done separately for every data packet is located in the IPSEC engine. When a non-regular packet comes into the IPSEC engine, the policy decision about its handling is referred to the policy manager. The policy manager will then send information to the IPSEC engine that allows it to make similar decisions on behalf of the policy manager concerning the following regular packets, until the policy manager sends new information to the IPSEC engine or some of the information expires. For example, in a typical TCP/IP session, the first packet in each direction will be a non-regular packet and gets passed to the policy manager, which will examine the packet and determine its policy rules. A typical policy will involve processing all packets of a TCP/IP session identically, and thus the policy manager may send information to the IPSEC engine that allows it to recognize future packets belonging to the same TCP/IP session as regular packets, and process them accordingly. Both the routine policy decisions for the following regular packets and their processing (e.g., encryption) take place in the IPSEC engine. The IPSEC engine applies transformations to the packets using cryptographic keys and other data it has received from the policy manager, or possibly from the key managers block through the policy manager.

There are also other actions besides routine policy decisions that need to be performed per packet. For instance, a security association may have a limited lifetime defined by the amount of data transmitted using that security association, implying that the amount of data already transmitted must be recorded and the transmission must be dropped or the establishing process of a new security association must be initiated if the lifetime expires. Data transmission statistics may need to be updated for every packet. All these actions are preferably performed by the IPSEC engine.

There are two types of information the policy manager sends to the IPSEC engine: security association parameters and compiled filter code. Security association parameters are information that are needed to apply an IPSEC transform (e.g., AH or ESP) on a packet. The parameters include such data as encryption keys, authentication keys, initialization vectors, reply prevention counters, tunneling information, and any other data that may be necessary to parameterize a transformation. The compiled filter code, on the other hand, is an executable (or interpretable) representation of some aspects of the security policy.

Figure 4:
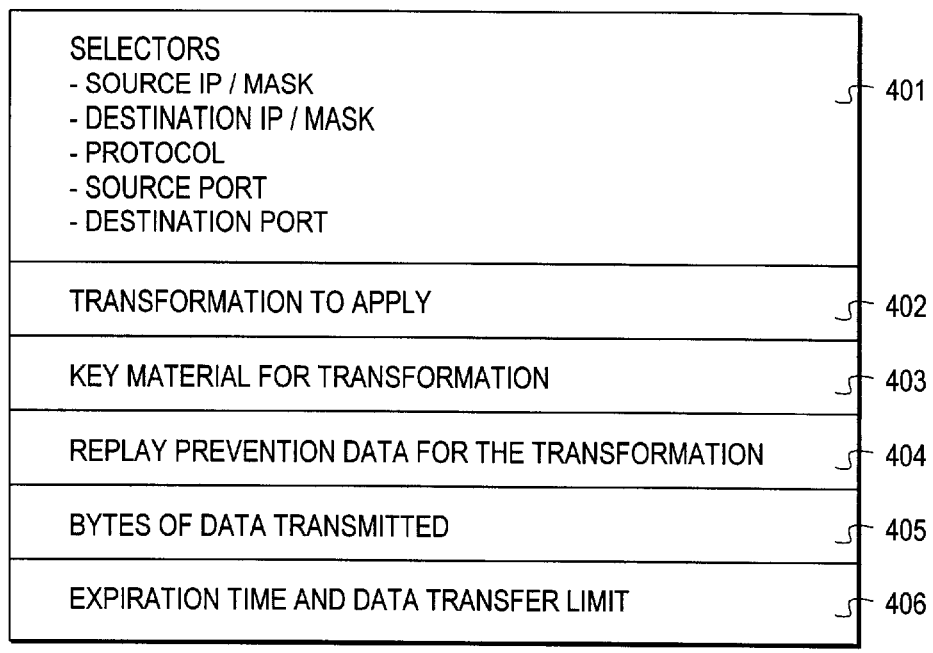
FIG. 4 illustrates details of information stored according to the invention.

FIG. 4 illustrates in table form the main data items to be stored in a security association. Cell 401 includes selectors constraining the security association. Cell 402 identifies the transformation that should be applied to the packets belonging to the security association and cell 403 includes the key material needed in the transformation. Cell 404 includes replay prevention data for the transmission and cell 405 indicates the number of bytes transmitted. Cell 406 includes the expiration time and data transfer limit of the security association. Security association parameters must be stored in the IPSEC engine separately for each security association, as each association typically has different encryption and authentication keys. Filter code, on the other hand, is typically stored separately for each network interface, with separate code for incoming and outgoing packets. The reason for this is that storing the code separately for each interface eliminates the possibilites for a hostile attacker to make a packet look like it had arrived from a different interface than it actually did. Additionally, code paths in the filter code will be shorter this way, making execution faster.

Information in the IPSEC engine actually acts as a cache for information stored in the policy manager. In other words, it is the policy manager that has authoritative information about active security associations. It may, at its discretion, send some of that data to the IPSEC engine, and create filter code that processes packets for those security associations in the filter code, and passes packets for other, less frequently used associations to the policy manager, so that the policy manager can then install the associations and filter code needed for those packets in the IPSEC engine before reprocessing the packet. This allows fixed memory allocation in the IPSEC engine, making resource exhaustion attacks against the operating system kernel impossible. The filter code can also cache the fact that certain types of packets are to be rejected, shortcircuiting the processing of unacceptable packets.

Figure 5:
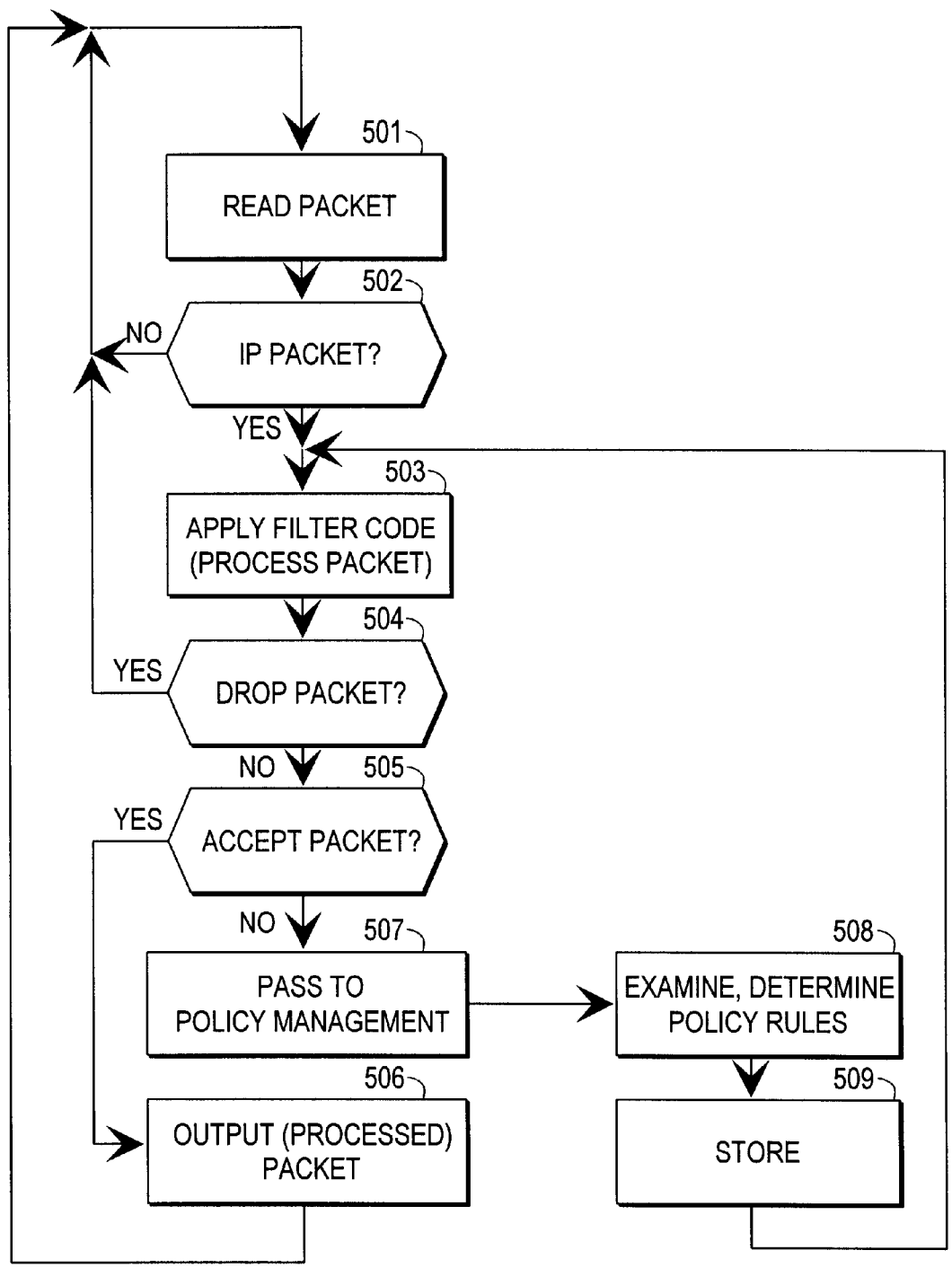
FIG. 5 is a flowchart representation of the method according to the invention and FIGS. 6a and 6b illustrate some physical implementations of the invention.

A simple preferable embodiment of a method according to the invention is summarized as a flowchart in FIG. 5. Blocks 501 and 502 correspond to the operation of the packet interceptor 303 in FIG. 3, i.e. letting only IP packets reach the IPSEC engine. Blocks 503 to 507 describe operations that take place in the IPSEC engine. In block 503 the IPSEC engine applies the filter code it has previously stored. Applying the filter code in block 503 may include performing transformations on the packet, but this is not required by the invention. During the application of the filter code, the validity of the information stored in the IPSEC engine is also checked in block 503 for possible security association lifetime expirations or other invalidities. If the packet is a regular packet, the IPSEC engine knows whether it should drop the packet according to block 504 or accept it according to block 505; an accepted packet is output according to block 506. If the application of the filter code involved performing a transformation or otherwise processing the packet, block 506 corresponds to outputting the processed packet. If the answer in block 505 was no, the packet is non regular and it must be transferred according to block 507 to the policy manager for examination and policy rule determination according to block 508. The resulting new policy decisions are stored into the IPSEC engine at block 509 in the form of compiled filter code and the operation continues from block 503: the packet that caused the visit to blocks 508 and 509 has now become a regular one because the newly stored compiled filter code contains information about how the packet should be treated.

The policy manager may also process a received non-regular packet by itself as an alternative to compiling new filter code and communicating it to the IPSEC engine. The designer of the policy manager may decide, what kind of non-regular packets are worth compiling new filter code and what kind of packets are most advantageously processed in the policy manager. Additionally the policy manager may process a received non-regular packet by itself and compile new filter code and communicate it to the IPSEC engine for the processing of further similar packets. The last alternative is especially applicable when the received packet is a key management packet.

As explained previously, the filter code is most advantageously stored in the operating system kernel. It consists of simple operations that can be executed quickly. Examples of filter code operations include: comparing a field in the packet header against a known value and branching based on the result of the comparison; optimized multiple choice selections of values; applying a transformation and continuing; dropping a packet; passing the packet through in its current form; and passing the packet to the policy manager for further consideration. The filter code according to the invention is thus a generalization of the traditional concept of evaluating boolean expressions.

The filter code in its preferred embodiment has several characteristics which are beneficial.

It is linear byte code, which means that it can easily be stored and passed around in a memory buffer or array.

All jumps in the byte code are forward, which implies that the filter code will always eventually terminate. It is easy to make the interpreter very robust.

There are no loops in the filter code. For example, if two transforms are to be applied inside each other, separate filter code is generated to process allowed values after the first application.

This prevents resource exhaustion attacks by multiple layers of encryption using the same security association.

There are also situations where processing packets in fragmented form is desirable. For example, if packets are to be tunneled inside a tunnel-mode AH or ESP transformation, it may not be desirable to reassemble the packets before applying the transformation, but to instead apply the tunneling transformation separately for each fragment.

The filter code in the IPSEC engine can be used for this purpose as well. The filter code can be applied to the first fragment of the packet as soon as the fragment has been received. A special filter code instruction can be used to abort processing if the full packet is needed. This instruction can be used in those code paths of the filter code that actually require a full packet. Those code paths that can process individual fragments (e.g., by applying a tunneling transformation, passing them through unmodified, or dropping them) do not include this instruction, and only access the part of the packet header that is always guaranteed to fit in the first fragment. Information will then be saved outside the filter code to process other fragments of the same packet using the same methods as for the first fragment.

The filter code described herein as interpreted may also be compiled into directly executable machine code by the policy manager, thus sending actual executable processor instructions to the IPSEC engine. Many optimizations on the executable programs are well known in the programming language and compiler literature, and have not been described here even though they apply to the filter code of this invention equally well as to other representations of programs. Methods for generating intermediate code from the set of rules are also well developed in the literature and known to those skilled in the art.

It is well-known to those skilled in the art that it is possible to structure the implementation quite differently from FIG. 3 without changing the essential content of this invention. For example, it is possible to implement the IPSEC engine and policy manager intermixed in the same module, or to implement the policy manager on above of key managers.

Even though the invention was described in the context of the IPSEC protocol, it is also applicable to other cryptographic security protocols that encrypt data on the packet level. In that case all IPSEC-related definitions in the previously presented description must naturally be changed to the corresponding definitions in the other security protocol.

Figure 6A:
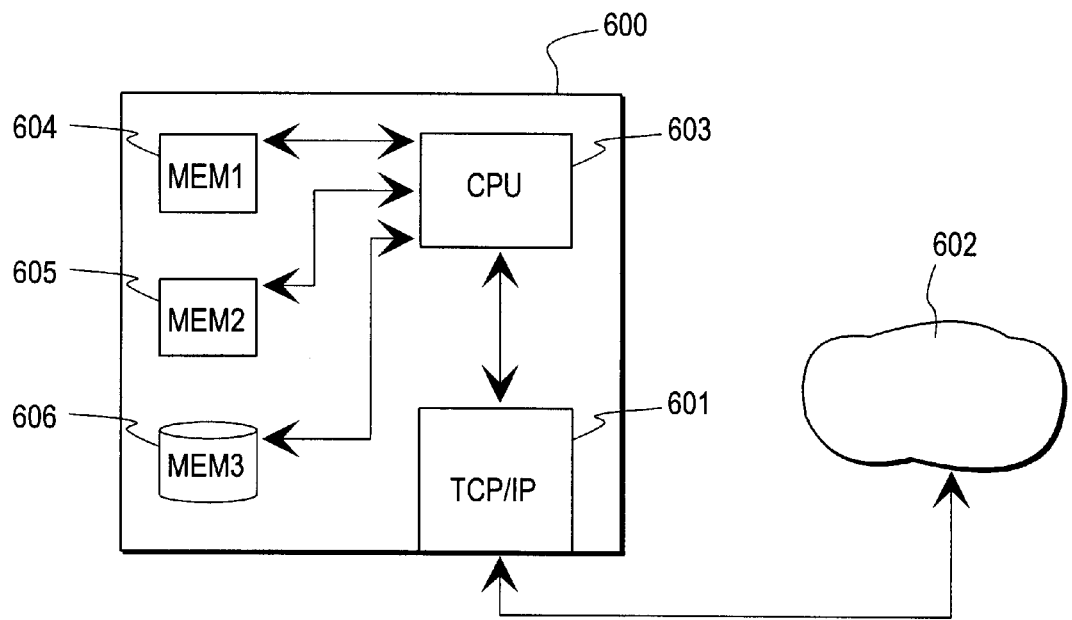
Figure 6B:
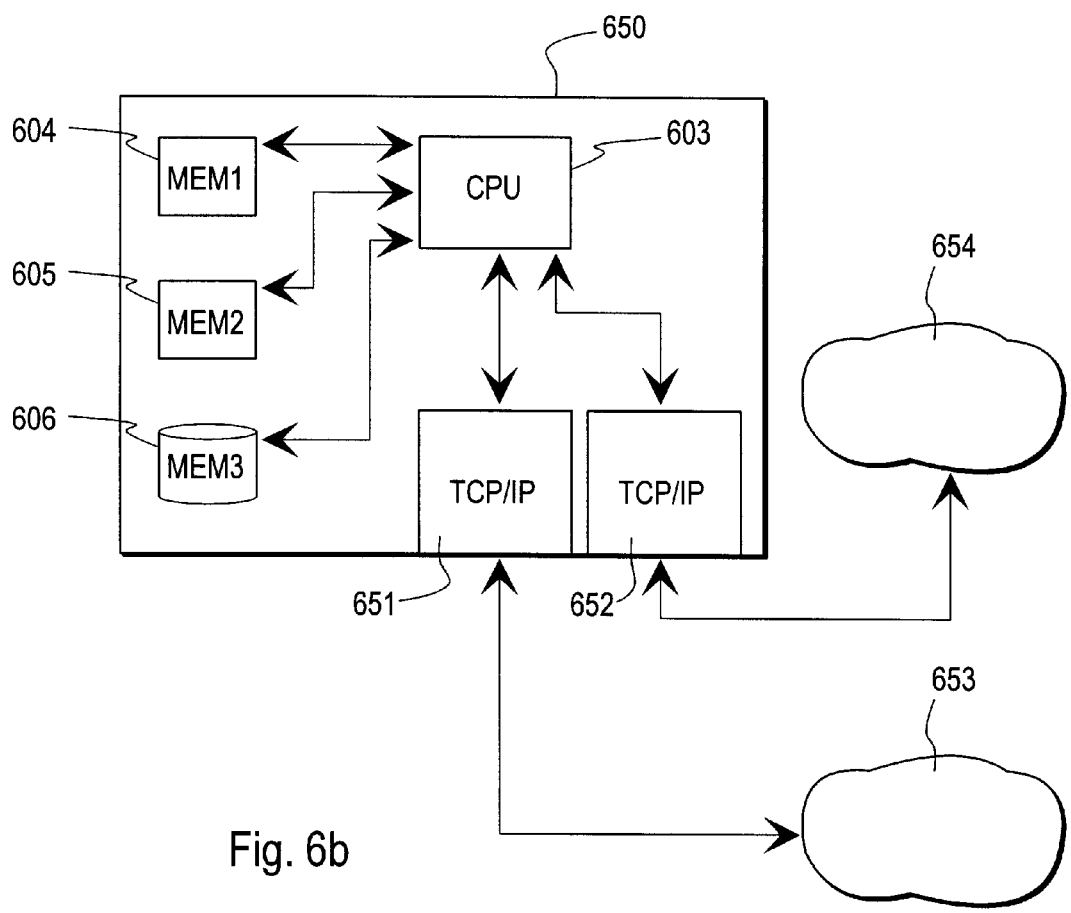

FIGS. 6a and 6b illustrate a data processing system 600 and a gateway device 650 that can be used to reduce the invention into practice. The system 600 of FIG. 6a has an TCP/IP adapter 601 for connecting into a network 602. A microprocessor 603 uses the TCP/IP adapter 601 to transmit and receive information over the network 602. The microprocessor 603 has a core memory 604 for storing the operating system kernel during use, and a separate, usually larger storage 605 for running user-mode processes. The memory blocks 604 and 605 may be implemented as parts of a single memory circuit; alternatively at least a part of one and/or the other may be located on the same chip with the microprocessor 603. A nonvolatile mass memory 606 is also included for storing programs and data. Taken that the structure of FIG. 3 is employed, the packet interceptor and the IPSEC engine reside in the core memory 604 along with the rest of the operating system kernel, and the policy manager and key managers block of FIG. 3 use the storage 605 for their operation.

The gateway device 650 is otherwise similar to the data processing system 600 but it contains two network adapters 651 and 652, one for connecting into an internal network 653 and one for connecting into a general data transfer network 654. The gateway device 650 is used to implement the IPSEC security features to protect the inhouse network 653 against attacks originating in the general data transfer network 654.

The devices of FIGS. 6a and 6b are naturally shown as examples only and they do not limit the invention. The data processing system 600 and the gateway device 650 may include other parts than those shown in FIGS. 6a and 6b.

What is claimed is:

1. A data processing system for implementing a security protocol based on processing data in packets, said data processing system comprising:

packet processing means for storing filter code and processing data packets according to stored filter code, and policy managing means for generating filter code and communicating generated filter code to said packet processing means, wherein said packet processing means is arranged to examine, whether the stored filter code is applicable for processing a certain packet, and to communicate such packets for the processing of which the stored filter code is not applicable to said policy managing means, and wherein said policy managing means is arranged to, as a response to receiving a packet from said packet processing means, either generate filter code applicable for the processing of the packet and communicate the generated filter code to said packet processing means, or process the packet by said policy managing means, or process the packet by said policy managing means and generate filter code applicable for the processing of the packet and communicate the generated filter code to said packet processing means.

2. A data processing system according to claim 1, further comprising a policy database for storing a plurality of policy rules, wherein said policy database is implemented as a part of said policy managing means.

3. A data processing system according to claim 2, further comprising key management means for implementing the key management functions according to said security protocol, wherein said key management means is arranged to communicate with said policy managing means.

4. A data processing system according to claim 3, wherein said key management means and said policy managing means are arranged to generate and maintain a plurality of security associations as specific applications of said policy rules and key management functions to certain communications.

5. A data processing system according to claim 4, wherein said policy managing means is arranged to generate filter code on the basis of the information contained within said policy rules and said security associations.

6. A data processing system according to claim 1, wherein said policy managing means is arranged to communicate information about security associations to said packet processing means in addition to the generated filter code, and said packet processing means is arranged to perform cryptographic transformations on packets, said cryptographic transformations being based on said filter code and said information about said security associations.

7. A data processing system according to claim 1, wherein said policy managing means is arranged to communicate information about only a fraction of security associations known to said policy managing means to said packet processing means.

8. A data processing system according to claim 7, wherein said packet processing means is arranged to store the filter code separately from said information about said security associations.

9. A data processing system according to claim 1, further comprising packet intercepting means for separating data packets for the processing of which said security protocol is applicable from a general stream of packets, wherein said packet intercepting means is arranged to communicate with said packet processing means.

10. A data processing system according to claim 1, further comprising means for implementing a kernel process in a kernel address space and means for implementing user-mode processes in a user-mode process address space, wherein said packet processing means resides in said kernel address space and said policy managing means resides in said user-mode process address space.

11. A data processing system according to claim 1, further comprising means for implementing a kernel process in a kernel address space and means for implementing user-mode processes in a user-mode process address space, wherein said packet processing means and said policy managing means both reside in said user-mode process address space.

12. A data processing system according to claim 1, further comprising at least two network interfaces, wherein said packet processing means is arranged to store separate filter code for each network interface.

13. A data processing system according to claim 1, wherein said packet processing means is arranged to process incoming and outgoing packets and store separate filter code for the processing of incoming and outgoing packets.

14. A data processing system according to claim 1, wherein said filter code does not contain any backward jumps.

15. A data processing system according to claim 1, wherein said filter code includes the operations of dropping a packet, passing a packet through, and referring the packet to the policy managing means.

16. A data processing system according to claim 15, wherein said filter code additionally includes the operation of applying a transformation to a packet.

17. A data processing system according to claim 1, wherein said packet processing means is arranged to process packets in fragments, applying said filter code to the processing of the first fragment of a packet before receiving the other fragments and processing any remaining fragments of the packet separately using the actions determined for the first fragment.

18. A data processing system according to claim 17, wherein said filter code contains an instruction to require, as a response to receiving a fragment, a full packet before processing can continue.

19. A data processing system according to claim 1, wherein said filter code consists of actual compiled processor instructions.

20. A method for implementing a security protocol based on processing data in packets, comprising the steps of:
   a) examining, whether a piece of stored filter code is applicable for processing a certain packet in a packet processing means, whereby a positive result means that a a piece of stored filter code is applicable for processing a certain packet and a negative result means that a piece of stored filter code is not applicable for processing a certain packet,
   b) following a positive result in step a), processing the packet in said packet processing means according to the stored filter code,
   c) following a negative result in step a), communicating the packet into a policy managing means and examining, whether filter code should be generated and communicated to said packet processing means for the processing of the packet in said packet processing means, whereby a positive result means that filter code should be generated and communicated to said packet processing means and a negative result means that filter code should not be generated and communicated to said packet processing means,
   d) following a positive result in step c), generating filter code applicable for the processing of the packet and communicating the generated filter code to said packet processing means,
   e) following a negative result in step c), examining, whether filter code should be generated and communicated to said packet processing means for the processing of further similar packets in said packet processing means, whereby a positive result means that filter code should be generated and communicated to said packet processing means and a negative result means that filter code should not be generated and communicated to said packet processing means,
   f) following a positive result in step e), processing the packet in the policy managing means and generating filter code applicable for the processing of further similar packet and communicating the generated filter code to said packet processing means, and
   g) following a negative result in step e), processing the packet in the policy managing means.

21. An apparatus for processing packets comprising:
   a computer having at least one network interface and having a memory having therein a operating system kernel address space and a user mode process address space;
   a policy manager computer program residing in said user mode address space and structured to control said computer to process received non regular packets in accordance with policy rules stored in a policy rules database, and to generate filter code for at least some received non regular packets which can be executed in said kernel operating space to process non regular packets of that type when nonregular packets of that type are received in the future;
   an IPSEC engine computer program residing in said kernel address space and structured to control said computer to receive and process regular packets in accordance with filter code which implements one or more policy rules where regular packets are defined as packets for which said filter code has code therein which implements a policy rule of a type appropriate to process that type of packet, and, non regular packets are defined as packets of a type where no filter code exists in said IPSEC engine computer program implementing a policy rule appropriate to process that type of packet, said IPSEC engine computer program structured to transmit said non regular packet to said policy manager computer program for further processing;
   a packet interceptor computer program residing in said kernel address space which is structured to control said computer to receive packets from said network interface, and if said packet is of a predetermined type, transmitting said packet to said IPSEC engine computer program for processing.

22. An apparatus as defined in claim 21 wherein said filter code is compiled code capable of direct execution by said computer without any intermediate interpretation step.

23. An apparatus as defined in claim 21 wherein said filter code is linear byte code which only forward jumps and no loops.

24. A method of speeding up the processing of IP packets in IPSEC packet transformation processing comprising:
   receiving a stream of packets and filtering out only an IP packet for processing by an IPSEC engine;
   transmitting said IP packet to an IPSEC engine in execution in an operating system kernel address space;
   if filter code exists in said IPSEC engine which is appropriate to process said IP packet, processing said IP packet in said IPSEC engine by executing filter code which encodes policy rules received from a policy manager program executing in a user mode address space, said execution of filter code performing any one or more known IPSEC processing functions on said packet, and if no filter code appropriate to process the type of IP packet received exists, transmitting said packet to said policy manager program for further processing.

25. A data processing system for implementing a security protocol based on processing data in packets, said data processing system comprising:
   packet processing means for storing filter code and processing data packets according to stored filter code, and
   policy managing means for generating filter code and communicating generated filter code to said packet processing means, wherein said packet processing means is arranged to examine, whether the stored filter code is applicable for processing a certain packet, and to communicate such packets for the processing of which the stored filter code is not applicable to said policy managing means, and wherein said policy managing means is arranged to, as a response to receiving a packet from said packet processing means generate filter code applicable for the processing of the packet and communicate the generated filter code to said packet processing means for use in processing the packet.

26. A data processing system for implementing a security protocol based on processing data in packets, said data processing system comprising:

packet processing means for storing filter code and processing data packets according to stored filter code, and policy managing means for generating filter code and communicating generated filter code to said packet processing means, wherein said packet processing means is arranged to examine, whether the stored filter code is applicable for processing a certain packet, and to communicate such packets for the processing of which the stored filter code is not applicable to said policy managing means, and wherein said policy managing means is arranged to, as a response to receiving a packet from said packet processing means process the packet send by said packet processing means.

27. A data processing system for implementing a security protocol based on processing data in packets, said data processing system comprising:

packet processing means for storing filter code and processing data packets according to stored filter code, and policy managing means for generating filter code and communicating generated filter code to said packet processing means, wherein said packet processing means is arranged to examine, whether the stored filter code is applicable for processing a certain packet, and to communicate such packets for the processing of which the stored filter code is not applicable to said policy managing means, and wherein said policy managing means is arranged to, as a response to receiving a packet from said packet processing means process the packet by said policy managing means and generate filter code applicable for the processing of the packet and communicate the generated filter code to said packet processing means.

28. A computer program product for processing packets comprising:

a computer usable medium having computer readable program code embodied in said medium for processing data packets and having:

computer readable computer code which implements a policy manager computer program structured to control said computer to process received non regular packets in accordance with policy rules stored in a policy rules database, and to generate filter code for at least some received non regular packets which can be executed in a computer to process non regular packets of that type when nonregular packets of that type are received in the future;

computer readable computer code which implements an IPSEC engine computer program which is structured to control a computer to receive and process regular packets in accordance with filter code which implements one or more policy rules where regular packets are defined as packets for which said filter code has code therein which implements a policy rule of a type appropriate to process that type of packet, and, non regular packets are defined as packets of a type where no filter code exists in said IPSEC engine computer program implementing a policy rule appropriate to process that type of packet, said IPSEC engine computer program structured to transmit said non regular packet to said policy manager computer program for further processing.

* * * * *